(12) United States Patent
Menke et al.

(10) Patent No.: US 8,211,305 B2
(45) Date of Patent: Jul. 3, 2012

(54) SYSTEM AND METHOD FOR THE RENOVATION OF PROCESS WATER

(75) Inventors: Lucas Menke, Munich (DE); George Troubounis, Munich (DE)

(73) Assignee: Meri Entsorgungstechnik fuer die Papierindustrie GmbH, Munich (DE)

( * ) Notice: Subject to any disclaimer, the term of this patent is extended or adjusted under 35 U.S.C. 154(b) by 586 days.

(21) Appl. No.: 12/086,684

(22) PCT Filed: Dec. 20, 2006

(86) PCT No.: PCT/EP2006/012355
§ 371 (c)(1),
(2), (4) Date: Sep. 25, 2009

(87) PCT Pub. No.: WO2007/076943
PCT Pub. Date: Jul. 12, 2007

(65) Prior Publication Data
US 2010/0025325 A1    Feb. 4, 2010

(30) Foreign Application Priority Data
Dec. 21, 2005    (DE) .................. 10 2005 061 302

(51) Int. Cl.
C02F 3/28    (2006.01)
(52) U.S. Cl. .................. 210/603; 210/631; 210/928
(58) Field of Classification Search .................. 210/603, 210/631, 928
See application file for complete search history.

(56) References Cited

U.S. PATENT DOCUMENTS

| 3,780,471 | A |   | 12/1973 | Ort |
| 4,597,872 | A |   | 7/1986  | Anderson et al. |
| 4,983,258 | A |   | 1/1991  | Maxham |
| 5,849,197 | A | * | 12/1998 | Taylor et al. .................. 210/652 |
| 6,322,701 | B1| * | 11/2001 | Delighiannis .................. 210/620 |
| 6,372,139 | B1|   | 4/2002  | Habets et al. |
| 6,514,379 | B1|   | 2/2003  | Gartz et al. |
| 2008/0099396 | A1 | | 5/2008 | Rother et al. |

FOREIGN PATENT DOCUMENTS

| DE | 40 42 224 A1   | 7/1992  |
| DE | 199 14 799 A1  | 10/2000 |
| DE | 199 18 695 A1  | 11/2000 |
| EP | 0615019 A1     | 9/1994  |
| EP | 1 097 908 A1   | 5/2001  |
| EP | 1 120 380 A2   | 8/2001  |
| JP | 5-337493 A     | 12/1993 |
| WO | WO 03/031348 A2| 4/2003  |
| WO | WO 2006/035042 A1 | 4/2006 |

OTHER PUBLICATIONS

Platt, Rudolf, et al., "Paper and Pulp," *Ullmann's Encyclopedia of Industrial Chemistry*, Wiley-VCH Verlag GmbH & Co. KGaA, Weinheim, pp. 1-157, (Jun. 15, 2005).
Japanese Office Action of Jul. 12, 2011 and English translation thereof.

* cited by examiner

*Primary Examiner* — Fred Prince
(74) *Attorney, Agent, or Firm* — Kilpatrick Townsend & Stockton LLP

(57) ABSTRACT

Disclosed is a system for renovating process water, especially during the production of paper. Said system comprises at least one process water renovation unit, at least one of which is provided with an anaerobic reactor spiked with anaerobic microorganisms as well as a lime elimination unit. Also disclosed is a method for renovating process water, particularly during the production of paper, which encompasses at least one process water renovation step in which at least some of the process water continuously delivered to the process water renovation step is subjected to a purification step in an anaerobic reactor that is spiked with anaerobic microorganisms and to a deliming step.

30 Claims, 3 Drawing Sheets

SYSTEM AND METHOD FOR THE RENOVATION OF PROCESS WATER

CROSS-REFERENCE TO RELATED APPLICATIONS

Figure 1:
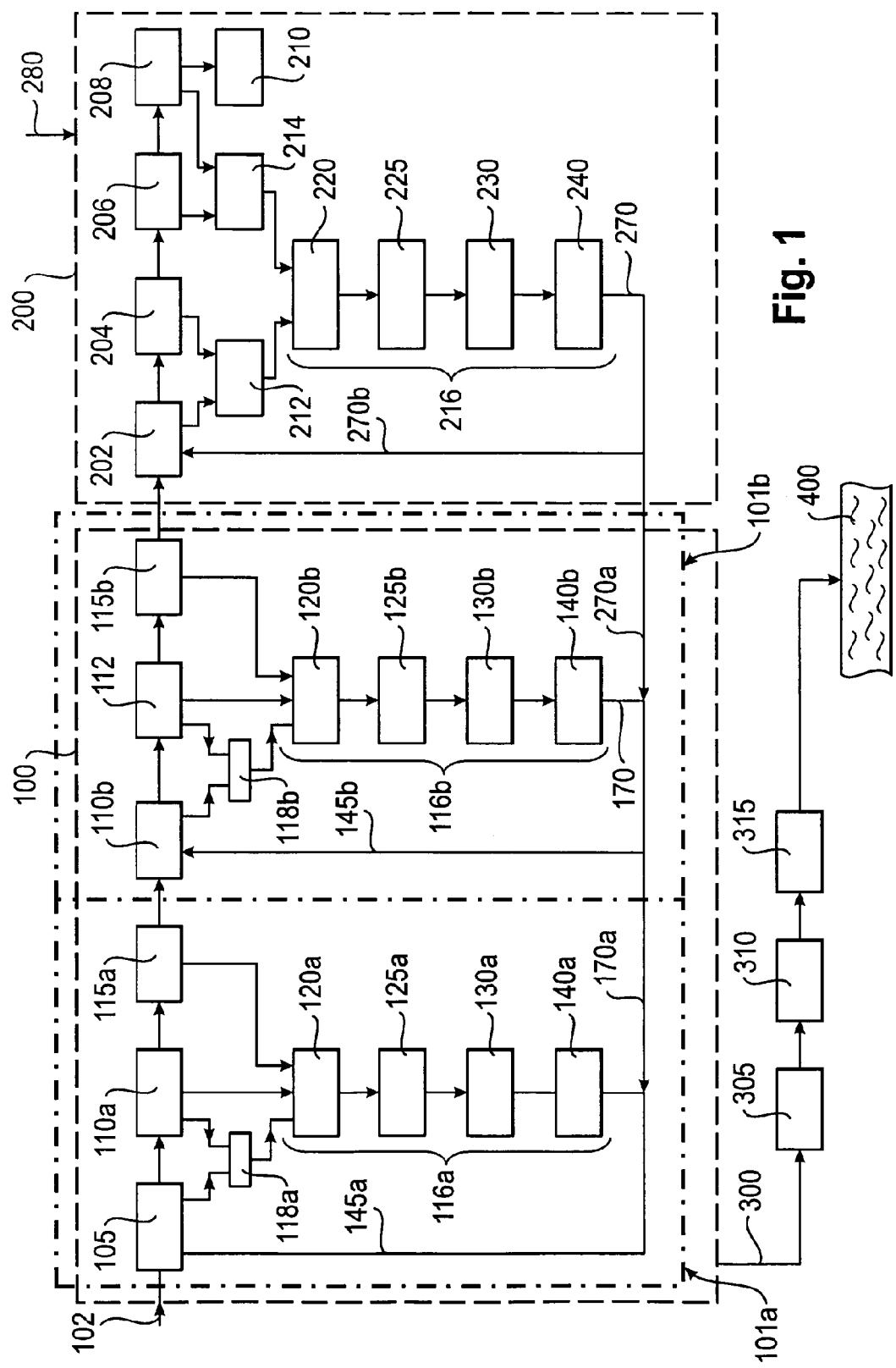

This application is a National Stage of International Application No. PCT/EP2006/012355, filed Dec. 20, 2006, and which claims the benefit of German Patent Application No. 10 2005 061 302.0, filed Dec. 21, 2005, the disclosures of both applications being incorporated herein by reference.

The present invention relates to a system for the treatment of process water, in particular for the treatment of process water in the manufacture of paper, wherein the system includes at least one process water treatment unit. The present invention furthermore relates to a method for the treatment of process water, in particular for the treatment of process water in the manufacture of paper.

A preparation of process water is in particular necessary in a number of technical fields in cases where the process water is guided in the circuit in the corresponding system to prevent an enrichment of the process water with interfering substances. This also in particular applies to the process water in the manufacture of paper, and indeed both in the manufacture of paper from fresh fibers and in particular in the manufacture of paper from recovered paper.

Over the past decades, paper has been increasingly obtained from recovered paper to lower energy consumption in the manufacture of paper and in particular to reduce consumption of natural resources. While around 2.2 metric tons (tonnes) of wood are required for the manufacture of a tonne of primary fiber paper, the wood requirements in paper recycling can be dramatically lowered or reduced to zero in dependence on the proportion of the secondary fibers originating from recovered paper with respect to the total fiber amount in the recycled paper. In addition, only half as much energy and only a third of the fresh water is required in the production of recycled paper in comparison with the manufacture of paper from primary fibers. The quality of recycled paper is today nevertheless as high as that of primary fiber papers with respect to ink hold-out, printing behavior, degree of whiteness and aging resistance.

In the manufacture of paper from recovered paper, the recovered paper is first mixed with water and comminuted in a pulper or pulping engine while stirring and mixing to dissolve the individual fiber composites. Subsequently, a cleaning of the fibers takes place to remove non-fibrous foreign bodies from the fibrous pulp before the fibers are optionally whitened and are finally processed to paper on a paper making machine, optionally after addition of a small proportion of primary fibers. A corresponding system consequently includes an apparatus for the treatment of recovered paper and a paper making machine, with the recovered paper treatment apparatus comprising a recovered paper puling unit, i.e. a pulper, in which process water is supplied to the recovered paper for the pulping and comminution of the fibers, a sorting apparatus for the removal of impurities and a deckering unit for the removal of process water. It is also known to provide two or more recovered paper treatment apparatus or stages, so-called loops, in the system to increase the quality of the treated fibers from the recovered paper. Each loop of the recovered paper treatment apparatus and the paper making machine in this connection preferably include their own process water treatment unit, with the individual process water treatment units being able to be decoupled from one another by a deckering unit provided between the individual loops.

To be able to guide the process water in every loop in the circuit and thus to be able to minimize the fresh water addition, the process water has to be cleaned to a required degree in the individual process water treatment units. For this purpose, the process water treatment units usually include a material recovery unit and/or a material removal unit in which fibers contained in the process water are mechanically separated from the process water to be led back in full or in part to the recovered paper treatment apparatus. These material recovery units or material removal units are usually designed as screening systems and/or as pressure relief flotation (dissolved air flotation) systems.

A system for the manufacture of paper from recovered paper is known from DE 40 42 224 A1 which includes a recovered paper treatment apparatus comprising a loop as well as a paper making machine. The recovered paper treatment apparatus includes a pulper into which recovered paper is introduced and is mixed with process water to repulp the old paper, a sorting stage which is provided downstream of the pulper and in which impurities are separated from the suspended pulp manufactured in the pulper, a thickening unit to remove the process water as much as possible from the suspended pulp, as well as a process water treatment unit to clean the process water. The process water treatment unit in turn substantially comprises a precleaning apparatus, an anaerobic purifying stage, for example including a UASB reactor, as well as an aerobic purifying stage. The process water purified in the process water treatment unit can either be disposed of as waste water or, in accordance with another embodiment, can be guided back into the pulper as repulping water in part and into the paper making machine in part, with in this case a part flow of white water from the paper making machine being added to the process water guided through the process water treatment unit of the recovered paper treatment apparatus.

The process water circuits of the paper making machine and of the process water treatment unit are thus not completely decoupled from one another in this system so that the quality of the process water in the paper making machine and the quality of the process water in the recovered paper treatment apparatus cannot be controlled efficiently and independently of one another. A further disadvantage of the last-named embodiment is that a high water hardness is adopted in the process water due to the partial circuit guidance and this water hardness can disturb the operation of the anaerobic UASB reactor. Microorganisms are namely used in anaerobic reactors for whose function it is important that they have a defined specific weight to be able to rise to the top in the reactor to separate the biogas formed at a gas separator during the degradation of the organic compounds from the process water due to the biogas which is formed in this process and which adheres to the microorganism pellets. After separation of the biogas, the specific weight may in particular not become so large that the microorganism pellets drop to the bottom of the reactor since they can otherwise no longer take part in the purification process. Due to their structure and size, however, microorganisms act as crystallization nuclei for lime deposits so that lime is deposited onto the microorganism pellets at a specific water hardness and at corresponding pH values, with these deposits resulting in an incalculable shift in the specific weight of the pellets so that they can no longer take over their function. The metabolic activity of the anaerobic microorganisms also causes a shift in the lime/carbon dioxide balance due to the generation of hydrogen carbonate ($HCO_3^-$) among other things, which further promotes a lime precipitation onto the microorganism pellets. In order to ensure the function of the micropellets despite the lime precipitation thereon, the recirculation amounts in the anaerobic reactor would have to be increased to keep the pellets in suspension in the reactor despite their larger specific weight. However, the recirculation amount is subject to limits by the hydraulic capacity of the separators, on the one hand, and by the necessity of keeping the flow in the reactor laminar, on the other hand. Higher recirculation amounts moreover cause the escape of carbon dioxide and thereby a further shift of the lime/carbon dioxide balance in the direction of lime precipitation due to the arising of pressure gradients at the suction and pressure side of the pump in the recirculation line.

It is therefore the object of the present invention to provide a system for the treatment of process water as well as a corresponding method, wherein the process water is purified efficiently, wherein in particular the water hardness and the quality of the process water can be directly controlled and which is also in particular suitable for the treatment of process water having a high water hardness such as process water in a system for the manufacture of paper from recovered paper. The treated water should in particular be purified such that a disturbance of the operation of an aerobic reactor due to lime precipitation phenomena can be reliably avoided.

This object is satisfied in accordance with the invention by a system in accordance with claim 1 and in particular by a system including at least one process water treatment unit, with at least one of the process water treatment units comprising an anaerobic reactor mixed with anaerobic microorganisms as well as a lime elimination unit.

Since the at least one of the process water treatment units includes an anaerobic reactor mixed with anaerobic microorganisms, the impurities contained in the process water, in particular the organic and biological impurities, can be removed efficiently. Due to the purity thereby achieved, the process water can be guided completely or at least almost completely in the circuit without the impurities being enriched by the circuit guidance. This allows a minimization of the fresh water requirements of the system. Since the process water treatment unit includes a lime elimination unit in addition to the anaerobic reactor, the water hardness in the process water guided in the circuit can moreover be controlled such that no lime depositions which disturb the microorganisms contained in the anaerobic reactor arise in the anaerobic reactor, whereby the efficiency of the anaerobic reactor is optimized. Overall, the system in accordance with the invention thus makes possible an at least almost complete circuit guidance of the process water and the efficient control of the quality of the process water. A further advantage of the system in accordance with the invention can be found in the fact that the anaerobically treated process water is charged with anaerobic microorganisms which cannot survive, or which cannot survive in an appreciable amount, in an aerobic environment such as is present in the process stages and in the containers of the water treatment, for example, so that a growth of microorganisms on the corresponding system parts such as occurs in systems having reactors including aerobic microorganisms can be reliably prevented.

The process water treatment system in accordance with the present invention can generally be integrated in any system in which process water is guided in the circuit. In particular in the manufacture of paper, the process water is polluted with significant amounts of impurities so that the system in accordance with the invention is in particular suitable for the cleaning of process water arising in the manufacture of paper, independently of whether it is process water of a system for the manufacture of paper from fresh fibers or process water of a system for the manufacture of paper from recovered paper.

In this case, the system in accordance with the invention includes, in addition to at least one process water treatment unit, at least one material preparation apparatus and/or at least one paper making machine, with at least one of the process water treatments units comprising an anaerobic reactor mixed with anaerobic microorganisms as well as a lime elimination unit being associated with the at least one material preparation apparatus and/or the least one paper making machine.

In particular when the system in accordance with the invention is a system for the manufacture of paper from recovered paper, it preferably has a recovered paper treatment apparatus as a material preparation apparatus for the manufacture of fiber material from the recovered paper and/or a paper making machine for the manufacture of paper from the pulp, with the recovered paper apparatus having one or more stages and at least one of these stages and/or the paper making machine including their own process water treatment unit, with the at least one of the process water treatment units including an anaerobic reactor mixed with anaerobic microorganisms as well as a lime elimination unit. In particular when the paper making machine and every stage or every loop of the recovered paper treatment apparatus include a process water treatment unit comprising an anaerobic reactor as well as a lime elimination unit, the process water quality, that is the amount of impurities contained in the process water, can be controlled separately for each loop. An optimum quality water management is thereby made possible in the manufacture of paper from recovered paper.

To achieve an efficient use of the recovered paper used in the system as well as of the fibers included therein, it is proposed in a further development of the idea of the invention furthermore to provide a material recovery unit and/or a material removal unit in the at least one process treatment unit. Good results are in particular achieved when the material recovery unit or the material removal unit is made as a combination of a material recovery apparatus (e.g. an apparatus with a screen barrier) and a microflotation apparatus (or pressure relief flotation apparatus) in series as a cascade. In the first stage, which is preferably made as a spray filtration, the useful fibers are recovered, whereas in the second stage, namely the material removal, the fine materials are removed from the process water.

In accordance with a further preferred embodiment, the at least one process water treatment unit furthermore includes a filtration unit to separate the solid particles contained in the process water. This filtration unit is preferably arranged downstream of the lime elimination unit as well as downstream of the anaerobic reactor.

The lime elimination unit can generally be arranged in the at least one process water treatment unit upstream or downstream of the anaerobic reactor. Since the mass freight, i.e. the concentration of solids in the process water, is lower downstream of the anaerobic reactor than upstream of the anaerobic reactor, the arrangement of the lime elimination unit downstream of the anaerobic reactor is advantageous, in particular with paper manufacturing systems with which graph papers are manufactured. The arrangement of the lime elimination unit upstream of the anaerobic reaction, in contrast, is in particular sensible with corresponding systems when a high number of fibers are contained in the process water and the fibers should be returned after the material separation. In the preferred embodiment, in which the at least one process water treatment unit includes a material recovery unit made as a microflotation apparatus or as a pressure relief flotation apparatus and/or a material removal unit, the lime elimination unit is also preferably arranged treatment of the anaerobic reactor in the at least one process water preparation unit since the lime elimination unit can then be combined in one apparatus with the microflotation apparatus or pressure relief flotation apparatus.

Particularly good results are in particular also achieved with respect to the removal of impurities from the process water when the lime elimination unit of the at least one process water treatment unit is a pressure relief flotation apparatus. With pressure relief flotation, the process water to be treated is preferably first set to a neutral or alkaline pH suitable for lime formation by the addition of a pH setting agent, for example sodium lye, said pH preferably being between 7 and 10, particularly preferably between 7 and 9, and very particularly preferably between 7.5 and 8.5. Optionally, precipitant and/or a flocculation aid can be mixed with the water to promote lime formation. Subsequently, pressure gas, preferably compressed air, is added to the mixture produced in this manner and this mixture is pressurized before the pressurized mixture is expanded or exposed to a reduced pressure in a pressure relief flotation reactor, whereby the previously added pressure gas fizzes out of the water at least very largely in the form of gas bubbles and flows upward. In this connection, the gas bubbles take along the lime flocs contained in the water so that they are separated from the water.

To achieve an efficient lime separation, it is proposed in a further development of the idea of the invention to configure the pressure relief flotation apparatus such that the pressure difference between the pressurization and the expansion amounts to at least 2 bar, preferably at least 3 bar, particularly preferably at least 4 bar and very particularly preferably at least 5 bar. The greater the aforesaid pressure difference, the smaller the gas beads arising during the expansion so that an increased lime separation is achieved due to the larger surface to volume ratio of the gas bubbles.

The pressure relief flotation apparatus preferably includes a precipitation device in which lime is precipitated from the process water by addition of a substance selected from the group including pH setting agents, precipitants, flocculation aids and any desired combinations thereof and a lime separation device in which precipitated lime is separated from the process water. For example, the precipitation device can include a pH setting device as well as a supply line for precipitant and/o a flocculation aid, whereas the lime separation device preferably comprises an admixture unit for pressure gas, a gas solution reactor for the physical solution of the pressure gas in the process water as well as a pressure relief flotation reactor.

Alternatively to the aforesaid embodiment, the lime elimination can also take place after corresponding precipitation by means of centrifugal force, for example using a centrifuge or using a cyclone.

To achieve a homogenous mixture of the process water with the substance selected from the group including pH setting agent, precipitants, flocculation aids and any desired combinations thereof in the aforesaid embodiment, the system in accordance with the invention preferably has a mixing unit for the homogeneous admixture of the aforesaid at least one substance.

In the aforesaid embodiment, both the precipitation device and the lime separation device can be arranged downstream of the anaerobic reactor. It is, however, equally possible to provide the precipitation device and the lime separation device in each case upstream of the anaerobic reactor or to arrange the precipitation device downstream of the anaerobic reactor and to provide the lime separation device upstream of the anaerobic reactor, with in the last-named case a part flow line leading from the anaerobic reactor into the precipitation device from where the process water leaving the precipitation device is guided via a corresponding line into the lime separation device and with a bypass line leading from the anaerobic reactor past the precipitation device into the filtration unit. The last named embodiment is in particular advantageous with systems for the manufacture of tissue paper not containing any ash. In the two last-named embodiments, in which at least the lime separation device is arranged upstream of the anaerobic reactor, this lime separation device preferably made as a pressure relief flotation apparatus can be integrated in the material recovery unit preferably made as a microflotation apparatus and/or in the material removal unit.

All types of anaerobic reactors known to the skilled person can be used as the anaerobic reactor mixed with anaerobic microorganisms, for example contact sludge reactors, UASB reactors, EGSB reactors, fixed bed reactors and fluidized bed reactors, with good results in particular being achieved with UASB reactors and ESGB reactors. A pre-acidification reactor can be connected before the anaerobic reactor and the process water is subjected to acidogenesis and/or hydrolysis in it before the supply into the anaerobic reactor. Whereas polymers such as polysaccharides, polypeptides and fats are degraded to their monomers such as sugar, amino acids and fatty acids during enzymatic hydrolysis by exoenzymes originating from microorganisms, these monomers are converted in the acidogenesis into organic acids, alcohols, aldehydes, hydrogen and carbon dioxide by acidogenic microorganisms.

In accordance with the invention, the material preparation apparatus of the system includes one or more stages, with good results in particular being achieved with 1 to 3 material preparation stages, with the mutually individual stages preferably being decoupled from one another by a deckering stage. The material preparation apparatus particularly preferably includes two mutually decoupled stages. In the case of a system for the manufacture of paper from recovered paper, in which the material preparation apparatus is designed as a recovered paper treatment apparatus, the material preparation stage(s) is/are made as recovered paper treatment stages.

Independently of the number of the stages of the material preparation apparatus, provision is made in accordance with a further preferred embodiment of the present invention that, in a system for the preparation of paper, both at least one of the stages of the material preparation apparatus and the paper making machine each include their own process water treatment unit, with the individual process water treatment units each having an anaerobic reactor as well as a lime elimination unit.

It is proposed in a further development of the idea of the invention that all the stages of the material preparation apparatus and the paper making machine each include their own process water treatment unit, with the individual process water treatment units each having an anaerobic reactor as well as a lime elimination unit. Since the paper making machine and every stage or every loop of the material preparation apparatus include a process water treatment unit comprising an anaerobic reactor as well as a lime elimination unit, the process water quality, that is the amount of impurities contained in the process-water, can be controlled separately for each loop. An optimum quality water management is thereby made possible in the manufacture of paper.

The system in accordance with the invention furthermore preferably includes a waste water purification apparatus via which some of the process water guided in the circuit is purified and is drained out of the system to replace this portion with fresh water.

In this connection, the waste water purification apparatus can include one or more devices which are selected from the group including material removal units, cooling units, biological waste water treatment units and any desired combinations thereof.

In the aforesaid embodiment, a part flow line is preferably provided in the system leading back from the waste water purification apparatus into the material preparation apparatus and/or into the paper making machine.

A further subject of the present invention is a method for the treatment of process water, in particular for the treatment of process water in the manufacture of paper, comprising at least one process water treatment step, with at least some of the process water continuously supplied to the process water treatment step being subjected to a purifying step in an anaerobic reactor mixed with anaerobic microorganisms as well as a deliming step.

The process water continuously supplied to the process water treatment step preferably comes from a material preparation apparatus, for example from a recovered paper treatment apparatus and/or from a paper making machine.

It is proposed in a further development of the idea of the invention to subject the process water to a pressure relief flotation step in the deliming step.

In the aforesaid embodiment, the pressure difference between the pressurization and the expansion in the pressure relief flotation step preferably amounts to at least 2 bar, particularly preferably at least 3 bar, very particularly preferably at least 4 bar and most preferably at least 5 bar.

The method in accordance with the invention is preferably carried out in the previously described system in accordance with the invention.

The present invention will be described in the following purely by way of example with reference to advantageous embodiments and to the enclosed drawings.

Figure 2:
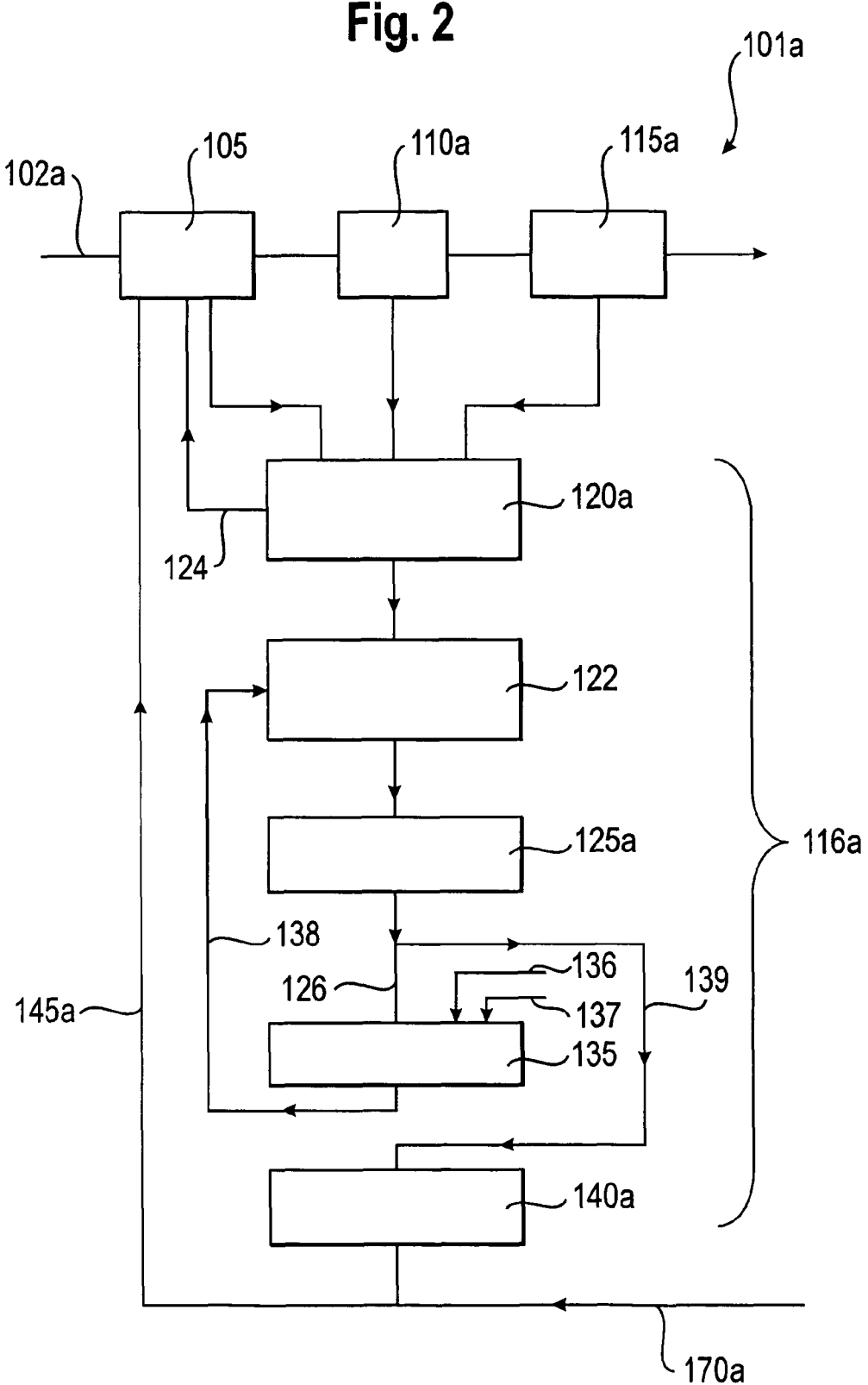
Figure 3:
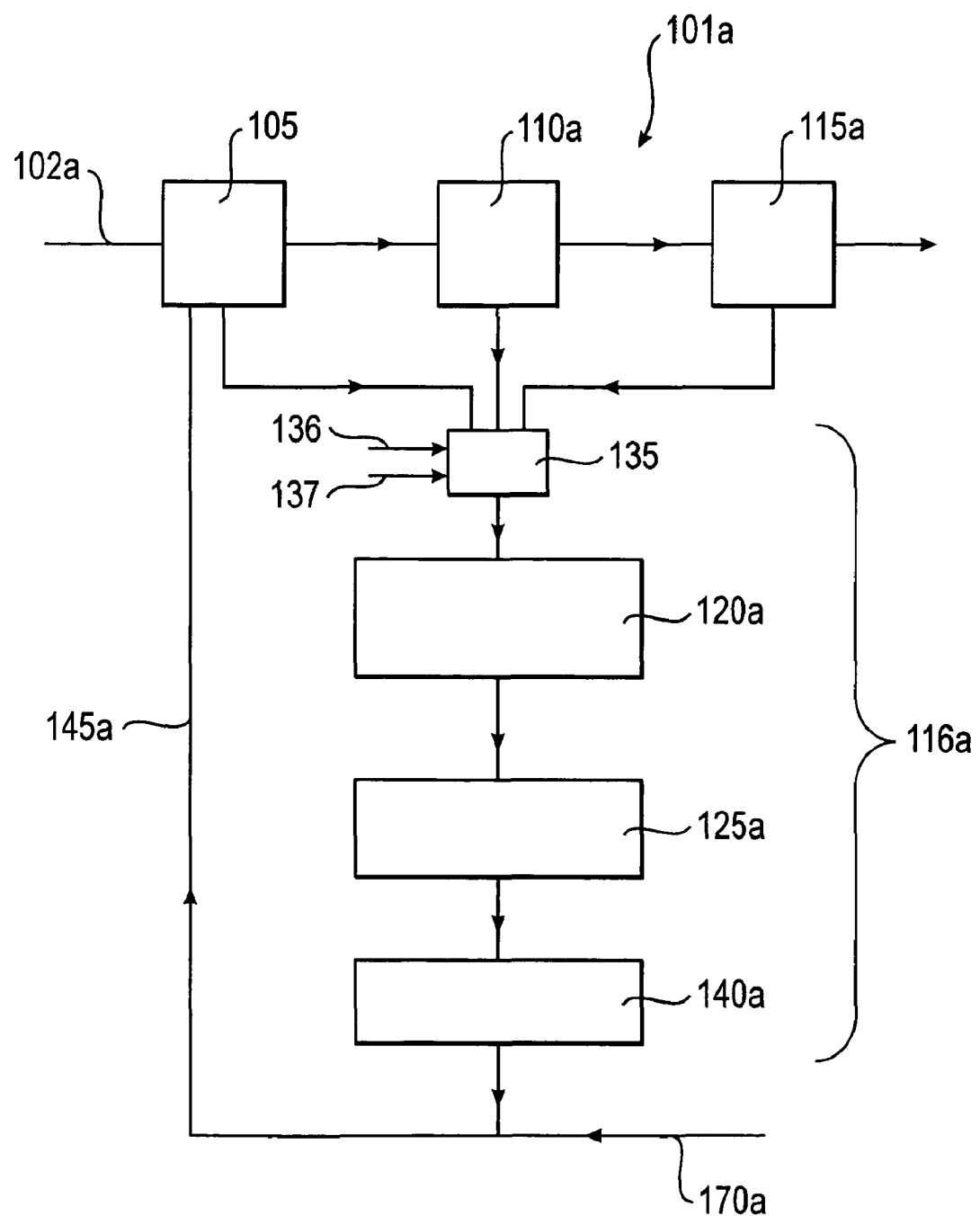

There are shown:

FIG. 1 a schematic view of a system for the manufacture of paper from recovered paper in accordance with a first embodiment of the present invention;

FIG. 2 a schematic view of a stage of a material preparation apparatus in accordance with a second embodiment of the present invention; and FIG. 3 a schematic view of a stage of a material preparation apparatus in accordance with a third embodiment of the present invention.

The system shown in FIG. 1 includes a recovered paper treatment apparatus 100 as well as a paper making machine 200 arranged downstream thereof and connected to the recovered paper treatment apparatus 100. In this connection, the recovered paper treatment apparatus 100 includes two stages or loops 101a and 101b substantially decoupled from one another and indicated by the chain dotted boxes in FIG. 1.

The first stage 101a of the paper treatment apparatus 100 includes a raw material inlet 102, a pulper or pulping engine 105, a sorting device 110a as well as a deckering unit 115a which are arranged sequentially and are each connected to one another. In the sense of the present invention, a pulper or pulping engine 105 is not only understood as a device, as shown schematically in FIG. 1, consisting of an apparatus part, but rather in particular also as an apparatus combination which includes a plurality of individual apparatus parts and which contains all the components or units required for the pulping. The same also applies to the sorting device 110a, the deckering unit 115a and all the other components shown in FIG. 1.

The pulping engine 105 and the sorting device 110a are each connected to a reject treatment unit 118a via a line.

The first stage 101a of the recovered paper treatment apparatus 100 moreover includes a process water treatment unit 116a to which there is supplied via corresponding lines from the reject treatment unit 118a, from the sorting apparatus 110a as well as from the deckering unit 115a the process water arising in these system parts. In this connection, the sorting apparatus 110a can also include a series of sorting devices (not shown). The process water treatment unit 116a consists of a material recovery unit 120a, an anaerobic reactor 125a mixed with anaerobic microorganisms, a lime elimination unit 130a as well as a filtration unit 140a which are arranged sequentially and are connected to one another. A return line 145a leads back from the filtration unit 140a to the pulping engine 105. In addition to the material recovery unit 120a or instead of the material recovery unit 120a, a material removal unit (not shown) can be provided in the recovered paper treatment apparatus 100.

Unlike the first stage 101a, the second stage 101b of the recovered paper treatment apparatus 100 includes a sorting apparatus 110b connected to the deckering unit 115a, an oxidation unit or reduction unit 112 as well as a deckering unit 115b which are arranged sequentially and are connected to one another. In addition, the second stage 101b has a process water treatment unit 116b which is made analog to the process water treatment unit 116a of the first stage 101a, with the filtration unit 140b of the second stage 101b of the recovered paper treatment apparatus 100 being connected via a return line 145b to the sorting apparatus 110b and via a part flow line 170a to the return line 145a of the first stage 101a of the recovered paper treatment apparatus 100 coming from the filtration unit 140a. While the sorting apparatus 110b and the oxidation unit or reduction unit 112 are connected via corresponding lines to a reject treatment unit 118b, the deckering unit 115b is connected directly to the material recovery unit 120b of the process water treatment unit 116b. In addition, a line leads from the oxidation unit or reduction unit 112 to the material recovery unit 120b.

The paper making machine 200 includes a centrifugal sorter 202, a fine sorting apparatus 204, a paper making machine shaping part 206, a paper making machine pressing part 208 as well as a drying part 210 which are arranged sequentially and are connected to one another. The centrifugal sorter 202 and the fine sorting apparatus 204 are connected to a reject treatment unit 212 and the paper making machine shaping part 206 and the paper making machine pressing party 208 are connected to a fiber recovery unit 214. In addition, the reject treatment unit 212 and the fiber recovery unit 214 are connected via corresponding lines to a process water treatment unit 216 which consists of a material removal unit 220, an anaerobic reactor 225 mixed with anaerobic microorganisms, a lime elimination unit 230 and a filtration unit 240. In addition, a return line 270 leads from the filtration unit 240 of the paper making machine 200 into the line 170 of the second stage 101b of the recovered paper treatment apparatus 100. The fiber recovery unit 214 and the material removal unit 220 can also be combined in an apparatus part made, for example, as a microflotation.

Furthermore, a fresh water line 280, via which fresh water can be supplied to the paper making machine, is provided in the region of the paper making machine 200. In this connection, the fresh water supply line 280 can open at various points in the paper making machine 200, for example in the supply line to the centrifugal sorter 202 and/or in the paper making machine shaping part 206 and/or the paper making machine pressing part 208 so that the exact position of the fresh water supply line 280 is not shown in FIG. 1. In addition, a waste water line 300 is provided in the system via which waste water can be drained out of the system. The waste water line 300 can also be arranged at different positions of the system, for example at the line 170 so that the exact position of the waste water line 300 is also not shown in FIG. 1. The waste water line 300 leads into a mechanical material removal unit 305 after which a cooling unit 310 as well as a biological waste water purifying unit 315 is connected. A line leads from the biological waste water cleaning unit 315, which can include a lime elimination unit and a filtration unit, into public waters 400, for example into a river; however, a part flow hereof can also be led back into the paper making machine or into the pulp treatment if required.

In the operation of the system, recovered paper is continuously introduced via the raw material inlet 102 into the pulping engine 105 of the first stage 101a of the recovered paper treatment apparatus 100 in that the recovered paper is mixed with process water supplied via the return line 145a and is comminuted for the recovery of the fibers. Whereas the fibers recovered in the pulping engine 105 are continuously moved into the sorting apparatus 110a as a fiber suspension, the process water which arises in the pulping engine 105 and can include residues of fibers is first guided into the reject treatment unit 118a and from there, after separation of the rejects, into the material recovery unit 120a of the process water preparation unit 116a of the recovered paper apparatus 100. In the sorting apparatus 110a, light or heavy non-belonging parts which are larger than fibers, such as coarse impurities in the form of plastic foils and plastic pieces are sorted from the fiber suspension, for example by screen barriers and typically in multiple stages. In addition, a flotation can also be carried out in the sorting apparatus for the purpose of the elimination of pigments, ink and dye particles (de-inking). In addition, fine materials and ash can be separated in the material wash. The fiber suspension is thickened by the removal of process water in the deckering unit 115a, which is arranged downstream of the sorting apparatus 110a and which is preferably made as a deckering filter and/or as a screw press, to move as a thickened fiber suspension from the deckering unit 115a into the sorting apparatus 110b of the second stage 101b of the recovered paper treatment apparatus 100. A part flow of the process water arising in the sorting apparatus 110a is guided into the reject treatment unit 118a, whereas the other part flow of the process water rising in the sorting apparatus 110a, together with the process water arising in the deckering unit 115a of the first stage 101a, is guided directly via corresponding lines into the material recovery unit 120a of the process water treatment unit 116a of the first stage 101a of the recovered paper treatment apparatus 100 in which pulp from the process water contained therein is separated which is again supplied to the treatment process. The material recovery unit 120a is preferably designed as a pressure relief flotation apparatus.

Alternatively to this, a part flow of the process water removed from the deckering unit 115a or the total process water removed from the deckering unit 115a can be led back directly into the pulping engine 105, i.e. while bypassing the process water treatment unit 116a. In particular in the treatment of paper in which the process water has a low solid concentration, such as in the manufacture of graph paper, the material recovery unit 120a, 120b or the material removal unit 122, 220 can be omitted.

In the system shown in FIG. 1, the process water arising in the reject treatment unit 118a is led into the material recovery unit 120a. Alternatively to this, however, it is also possible to drain off the process water arising in the reject treatment unit 118a as waste water from the recovered paper treatment apparatus 101a and, for example, to guide it via the waste water line 300 into the mechanical material removal unit 305 and subsequently through the cooling unit 310 and the biological waste water cleaning unit 315.

Process water liberated of pulp is guided continuously from the material recovery unit 120a into the anaerobic reactor 125a mixed with anaerobic microorganisms in which chemical and biological impurities are degraded by the effect of the anaerobic microorganisms in the process water. In this connection, a cooling stage (not shown) and a pre-acidification reactor (not shown), in which the process water is subjected to acidogenesis and/or hydrolysis, can be connected before the anaerobic reactor 125a for the purpose of setting the process water to an optimum temperature range. The process water liberated in this manner from the chemical and biological impurities is led from the anaerobic reactor 125a into the lime elimination unit 130a which is disposed downstream and which is preferably made as a pressure relief flotation apparatus. The carbonates and hydrogen carbonates present in the process water are very largely precipitated as lime and removed from the process water in this lime elimination unit 130a. In addition, a so-called "flash oxidation" takes place in the lime elimination unit 130a in which metabolic end products of the microorganisms formed in the anaerobic reactor 125a are oxidized by the supplied dissolved air or by air oversaturation, whereby an additional oxidative degradation of the impurities and/or disturbing materials contained in the process water takes place and an odor emission is largely reduced. The lime precipitation takes place in this connection by shifting the lime/carbon dioxide balance, said lime precipitation being achieved by metering in suitable chemicals, in particular a pH setting agent by which the pH of the process water is set to a neutral or alkaline value which preferably amounts to between 7 and 10, particularly preferably between 7 and 9 and very particularly preferably between 7.5 and 8.5. In addition, for this purpose, precipitant and/or flocculation aids can be added to the process water to facilitate the precipitation of lime and the formation of lime flocs having a size suitable for effective separation. In addition, pressure gas, for example compressed air, is introduced into the pressure relief flotation apparatus and the mixture generated in this manner is pressurized before this mixture is exposed to a reduced pressure. The pressure gas thereby fizzes out of the mixture and flows upwardly in the apparatus in the form of small bubbles, whereby solids, in particular the formed lime flocs, are taken along and are separated from the process water. The purified process water delimed in this manner is supplied from the lime elimination apparatus 130a to a filtration unit 140a which is made, for example, as a sand filtration unit to remove the remaining particular material from the process water. In addition, a desalination unit (not shown) can be connected after the filtration unit 140a.

The process water purified and delimed in the process treatment unit 116a of the first stage 101a of the recovered paper preparation apparatus 100 is led back via the return line 145a into the pulper or pulping engine 105.

The thickened fiber suspension drained off from the deckering unit 115a of the first stage 101a of the recovered paper treatment apparatus 100 moves into the sorting stage 110b and from there into an oxidation unit or reduction unit 112 before the fiber suspension is thickened in the deckering unit 115a of the second stage 101b in order to remove as much of the process water as possible from the fiber suspension. Analogously to the first stage 101a of the recovered paper treatment apparatus 100, the process water arising in the sorting apparatus 110b and a part flow of the waste water arising in the oxidation unit or reduction unit 112 are guided into the reject treatment unit 118b and the process water arising there is led into the material recovery unit 120b. The other part flow of the process water arising in the oxidation unit or reduction unit 112 as well as the process water arising in the deckering unit 115a are led directly into the material recovery unit 120b of the process water treatment unit 116b of the second stage 101b of the recovered paper treatment apparatus 100 and are purified and delimed in the process water treatment unit 116b. The process water treated in this manner moves in the larger part from the filtration unit 140b via the line 170 and the return line 145b back into the sorting apparatus 110b, whereas any possible excess of process water is guided back via the part flow line 170a to the first stage 101a of the recovered paper treatment apparatus 100 and is led into the return line 145a leading into the pulping engine 105.

In the paper making machine 200, the thickened pulp suspension supplied continuously from the deckering unit 115b is processed to paper by means of the centrifugal sorter 202, in which portions with a higher or lower specific weight than water is separated, the fine sorting apparatus 204, the paper making machine shaping part 206, the paper making machine pressing part 208 and the drying part 210. Whereas the process water arising in the system parts 202 and 204 is guided into the reject treatment unit 212, the process water arising in the system parts 206 and 208 is led into the fiber recovery unit 214. Whereas the rejects are deckered in the reject treatment unit 212, the process water originating from the paper making machine shaping part 206 and the paper making machine pressing part 208 undergoes preremoval of material in the fiber recovery unit 214 and fibers are separated from it. Process water arising in the reject treatment unit 212 and in the fiber recovery unit 214 is led continuously into the process water treatment unit 216 of the paper making machine 200 and there sequentially flows through the material removal unit 220, the anaerobic reactor 225, the lime elimination unit 230 and the filtration unit 240 which work like the previously described corresponding system parts of the process water treatment units 116a, 116b of the recovered paper treatment apparatus 100. Alternatively to this, the process water arising in the reject treatment unit 212 can be drained out of the system as waste water and only the process water arising in the fiber recovery unit 214 can be led continuously through the process water treatment unit 216 of the paper making machine 200. The purified and delimed process water removed from the filtration unit 240 is largely led back into the centrifugal sorter 202 of the paper making machine 200 via the return line 270 and the part flow line 270b, whereas any possible excess of process water is led via the part flow line 270a into the line 170 coming from the filtration unit 140b of the second stage 101b of the recovered paper treatment apparatus 100.

A completely closed process water circuit would admittedly generally be possible, but would result in enrichments of disturbing materials in the long term which would ultimately impair the efficiency of the system. A relatively small portion of fresh water, relative to the amount of process water guided in the circuit, is therefore supplied to the process, preferably to the paper making machine 200, via the fresh water supply line 280. A corresponding amount of process water is removed from the process via the waste water line 300 and is further purified via the material removal unit 305, the cooling unit 310 and the biological waste water purification unit 315, which can also include a lime elimination unit and/or a filtration unit, before this flow is drained into public waters 400 as waste water. In addition, the waste water optionally drained, as mentioned above, from the reject treatment units 118a, 118b, 212 can also be removed from the process via the waste water line 300 and can be purified via the material removal unit 305, the cooling unit 310 and the biological waste water unit 315.

The arrangement of the lime elimination units 130a, 130b, 230 shown in FIG. 1 is in particular preferred in the manufacture of graph papers because the mass freight, i.e. the solid concentration in the process Water, is comparatively small.

In the embodiment shown in FIG. 1, it is a system for the manufacture of paper from recovered paper. In this connection, the pulping engines 105, sorting devices 110a, 110b, deckering units 115a, 115b, oxidation unit or reduction unit 112, centrifugal sorter 202, fine sorting apparatus 204, paper making machine shaping part 206 and paper making machine pressing part 208 shown in FIG. 1 are only shown schematically and do not reproduce the paper making system down to the last detail. For example, one of the two sorting apparatus 110a, 110b or both of the sorting apparatus 110a, 110b can also be made in multiple stages and consequently include a sequence of sorting devices.

The system in accordance with the invention can equally be a system for the manufacture of paper from fresh fibers or any desired other system in which at least one process water treatment unit is provided, with at least one of the process water treatment units having an anaerobic reactor mixed with anaerobic microorganisms as well as a lime elimination unit. In the last-named case, the pulping engines 105, sorting devices 110a, 110b, deckering units 115a, 115b, oxidation unit or reduction unit 112, centrifugal sorter 202, fine sorting apparatus 204, paper making machine shaping part 206 and paper making machine pressing part 208 shown in FIG. 1 have been replaced by corresponding other apparatus or apparatus parts.

In FIG. 1, the system includes a two-stage pulp preparation. It is naturally also possible to provide two or more parallel material preparation stages, in particular for the manufacture of multilayer paper.

In FIG. 2, a schematic view of a stage 101a of a recovered paper preparation apparatus having a process water treatment unit 116a in accordance with a second embodiment of the present invention is shown which can replace the corresponding process water treatment unit 116a of the first stage 101a of the recovered paper treatment apparatus 100 of the system shown in FIG. 1. Alternatively to this, it is also possible to replace all the process water treatment units 116a, 116b, 216 of the system shown in FIG. 1 in each case by a process water treatment unit 116a shown in FIG. 2.

The stage 101a shown in FIG. 2, in contrast to the process water treatment unit 116a shown in FIG. 1, has, in addition to the material recovery unit 120a a material removal unit 122 which is arranged between the material recovery unit 120a and the anaerobic reactor 125a. A return line 124 leads from the material recovery unit 120 into the pulping engine 105.

In a further difference to the embodiment shown in FIG. 1, the stage 101a shown in FIG. 2 does not include any reject treatment unit 118a. Alternatively to this, however, a reject treatment unit (not shown) can also be provided in the embodiment shown in FIG. 2 to which the process water arising in the pulping engine 105 and a part flow of the process water arising in the sorting apparatus 110a are supplied via corresponding lines and from which the process water removed in the reject treatment unit is led into the material recovery unit 120a or is removed from the system as waste water.

In addition, a precipitation device 135 is provided in the process water treatment unit 116a downstream of the anaerobic reactor 125a and has two supply lines 136, 137 via which pH setting agents such as sodium lye, precipitants such as polyaluminum chloride and/or flocculation aids such as polyacrylamide can be supplied. A bypass line 139 leads from the anaerobic reactor 125a past the precipitation device 135 into the filtration unit 140a and guides a part flow line 126 to the precipitation device 135. A part flow return line 138 is provided from the precipitation device 135 to the material removal unit 122.

In operation of the stage 101a shown in FIG. 2, the process water continuously arising in the pulping engine 105, in the sorting apparatus 110a and in the deckering unit 115a is led into the material recovery unit 120a and from there into the material removal unit 122. Whereas coarser fibers are retained in the material recovery unit 120a and are led back into the pulping engine 105 via the return line 124, the process water arising in the material recovery unit 120a is led into the material removal unit 122 in which fine organic and/or inorganic particular material is separated from the process water. The process water is led continuously from the material removal unit 122 into the anaerobic reactor 125a. A main flow of at least 50% of the process water leaving the anaerobic reactor 125a is guided back via the bypass line 139 into the filtration unit 140a and from there via the return line 145a into the pulping engine 105. The other part flow of less than 50% of the process water leaving the anaerobic reactor 125a is led via the part flow line 126 into the lime precipitation device 135 to which pH setting agent as well as precipitant and/or flocculation aid are moreover supplied via the supply lines 136, 137 to precipitate lime in the process water. The part flow of the process water leaving the lime precipitation device 135 is guided back via the part flow return line 138 into the material removal unit 122 designed as a microflotation unit in which the precipitated lime is separated from the process water.

This embodiment is in particular suitable for the manufacture of tissue paper from recovered paper.

Even though the embodiment show in FIG. 2 was described with reference to a recovered paper treatment system, the process water treatment unit 116a shown in FIG. 2 can naturally also be provided in a system for the manufacture of paper from fresh fibers or in any other desired system in which at least one process water treatment unit is provided.

In FIG. 3, a schematic view of a stage 101a of a recovered paper treatment apparatus having a process water treatment unit 116a in accordance with a third embodiment of the present invention is shown which can replace the corresponding process water treatment unit 116a of the first stage 101a of the recovered paper treatment apparatus 100 of the system shown in FIG. 1. Alternatively to this, it is also possible to replace all the process water treatment units 116a, 116b, 216 of the system shown in FIG. 1 in each case by a process water treatment unit 116a shown in FIG. 3.

In the process water treatment unit 116a shown in FIG. 3, a precipitation device 135 is provided upstream of the material recovery unit 120a and has two supply lines 136, 137 via which pH setting agents such as sodium lye, precipitants, such as polyaluminum chloride, and/or flocculation aids, such as polyacrylamide, can be supplied to the precipitation device 135. Alternatively to this, a reject treatment unit (not shown) described with respect to the embodiment shown in FIG. 1 can also be provided in this embodiment.

In the operation of this process water treatment unit 116a, the process water arising in the pulping engine 105, in the sorting apparatus 110a and in the deckering unit 115a is led continuously into the precipitation device 135 in which the carbonates and hydrogen carbonates contained in the process water are precipitated as lime from the process water by the setting of corresponding precipitation conditions by the addition of pH setting agent, precipitant and/or flocculation aid.

The mixture created in this manner is led into the material recovery unit 120a designed as a pressure relief flotation apparatus in which the fibers contained in the process water and the lime flocs contained in the process water are separated. The material recovery unit 120a consequently simultaneously works as a lime separation unit.

After the separation of the lime and of the fibers, the process water runs through the anaerobic reactor 125a and the filtration unit 140a before the process water is guided back via the return line 145a into the material recovery unit 120a, 120b and/or the material removal unit (not shown).

Advantageously with respect to the system shown in FIG. 1, the lime elimination unit is thus combined with the pulping engine 105 in the process water treatment unit 116a shown in FIG. 3.

REFERENCE NUMERAL LIST 100 material/recovered paper treatment apparatus
101a first stage of the material/recovered paper treatment apparatus
101b second stage of the material/recovered paper treatment apparatus
102 raw material inlet
105 pulper/pulping engine
110a, 110b sorting apparatus
112 oxidation unit/reduction unit
115a, 115b) deckering unit
116a, 116b process water treatment unit of the material/recovered paper treatment apparatus
118a, 118b reject treatment unit
120a, 120b material recovery unit
122 material removal unit
124 return line
125a, 125b anaerobic reactor
126 part flow line
130a, 130b lime elimination unit
135 lime precipitation unit
136 supply line for pH setting agent
137 supply line for precipitant/flocculation aid
138 part flow return line
139 bypass line
140a, 140b filtration unit
145a, 145b return line
170 line
170a part flow line
200 paper making machine
202 centrifugal sorter
204 fine sorting apparatus
206 paper making machine shaping part
208 paper making machine pressing part
210 drying part
212 reject treatment unit
214 fiber recovery unit
216 process water treatment unit of the paper making machine
220 material removal unit
225 anaerobic reactor
230 lime elimination unit
240 filtration unit
270 return line
270a, 270b part flow line
280 fresh water supply line
300 waste water line
305 mechanical material removal unit
310 cooling unit 315 biological waste water purification unit
400 public waters

The invention claimed is:

1. A method of treating process water guided in a circuit, comprising:
purifying at least some of the process water in an anaerobic reactor, wherein the purifying comprises mixing the at least some of the water with anaerobic microorganisms; and
deliming the at least some of the process water, wherein the deliming comprises pressure relief flotation.

2. The method of claim 1, wherein the process water comes from a material preparation apparatus and/or from a paper making machine.

3. The method of claim 2, wherein the process water comes from at least one stage of a recovered paper treatment apparatus and/or from a paper making machine.

4. The method of claim 1, wherein a pressure difference between pressurizing and expansion in the pressure relief flotation amounts to at least 2 bar.

5. The method of claim 1, wherein the method is carried out in a system comprising at least one process water treatment unit comprising an anaerobic reactor comprising anaerobic microorganisms; the process water treatment unit further comprising a lime elimination unit.

6. The method of claim 5, wherein the system further comprises at least one material preparation apparatus and/or at least one paper making machine, wherein the process water treatment unit is associated with the at least one material preparation apparatus and/or the at least one paper making machine.

7. The method of claim 5, wherein the system further comprises:
a recovered paper treatment apparatus for manufacture of pulp from recovered paper, the recovered paper treatment apparatus comprising one or more stages; and/or
a paper making machine for manufacture of paper from the pulp;
wherein at least one of the stages and/or the paper making machine comprises the process water treatment unit.

8. The method of claim 5, wherein the process water treatment unit further comprises a material recovery unit and/or a material removal unit.

9. The method of claim 5, wherein the process water treatment unit further comprises a filtration unit disposed downstream of both the lime elimination unit and of the anaerobic reactor.

10. The method of claim 5, wherein the lime elimination unit is disposed upstream of the anaerobic reactor.

11. The method of claim 5, wherein the lime elimination unit is disposed downstream of the anaerobic reactor.

12. The method of claim 5, wherein the lime elimination unit comprises a pressure relief flotation apparatus.

13. The method of claim 12, wherein the pressure relief flotation apparatus is configured such that a pressure difference between pressurization and expansion amounts to at least 2 bar.

14. The method of claim 12, wherein the pressure relief flotation apparatus comprises a precipitation device and the deliming comprises precipitating lime from the process water by adding a substance selected from the group consisting of pH setting agents, precipitants, flocculation aids and any desired combination thereof; wherein the pressure relief flotation device further comprises a lime separation device, the method further comprising separating the precipitated lime from the process water.

15. The method of claim 14, wherein the system further comprises a mixing unit, and wherein the method further comprises homogeneous mixing of a substance selected from the group consisting of pH setting agents, precipitants, flocculation aids and any desired combination thereof into the process water.

16. The method of claim 14, wherein the precipitation device and the lime separation device are both arranged downstream of, or are both arranged upstream of, the anaerobic reactor.

17. The method of claim 14, wherein the precipitation unit is disposed downstream of the anaerobic reactor and the lime separation device is disposed upstream of the anaerobic reactor, the system further comprising a part flow line leading from the anaerobic reactor into the precipitation device, wherein the water leaving the precipitation device is guided via a line into the lime separation device, the system further compristing a bypass line leading from the anaerobic reactor past the precipitation device into the filtration unit.

18. The method of claim 17, wherein the lime separation device comprises a material recovery unit and/or a material removal unit.

19. The method of claim 12, wherein the pressure relief flotation apparatus is configured such that a pressure difference between pressurization and expansion amounts to at least 3 bar.

20. The method of claim 12, wherein the pressure relief flotation apparatus is configured such that a pressure difference between pressurization and expansion amounts to at least 4 bar.

21. The method of claim 12, wherein the pressure relief flotation apparatus is configured such that a pressure difference between pressurization and expansion amounts to at least 5 bar.

22. The method of claim 5, wherein the system comprises at least two stages which are decoupled from one another by a deckering stage.

23. The method of claim 22, wherein at least one of the stages comprises the process water treatment unit.

24. The method of claim 22, wherein each of the stages comprises one of the at least one process water treatment unit.

25. The method of claim 5, wherein the system further comprises a waste water purification apparatus, the method further comprising purifying some of the process water in the waste water purification apparatus and draining the some of the water out of the system.

26. The method of claim 25, wherein the system further comprises a part flow line which leads back from the waste water purification apparatus into the system and/or into the paper making machine.

27. The method of claim 25, wherein the waste water apparatus comprises one or more devices which are selected from the group consisting of material removal units, cooling units, biological waste water treatment units, and any desired combinations thereof.

28. The method of claim 1, wherein a pressure difference between pressurizing and expansion in the pressure relief flotation amounts to at least 3 bar.

29. The method of claim 1, wherein a pressure difference between pressurizing and expansion in the pressure relief flotation amounts to at least 4 bar.

30. The method of claim 1, wherein a pressure difference between pressurizing and expansion in the pressure relief flotation amounts to at least 5 bar.

* * * * *